Figures 1, 2, 3:
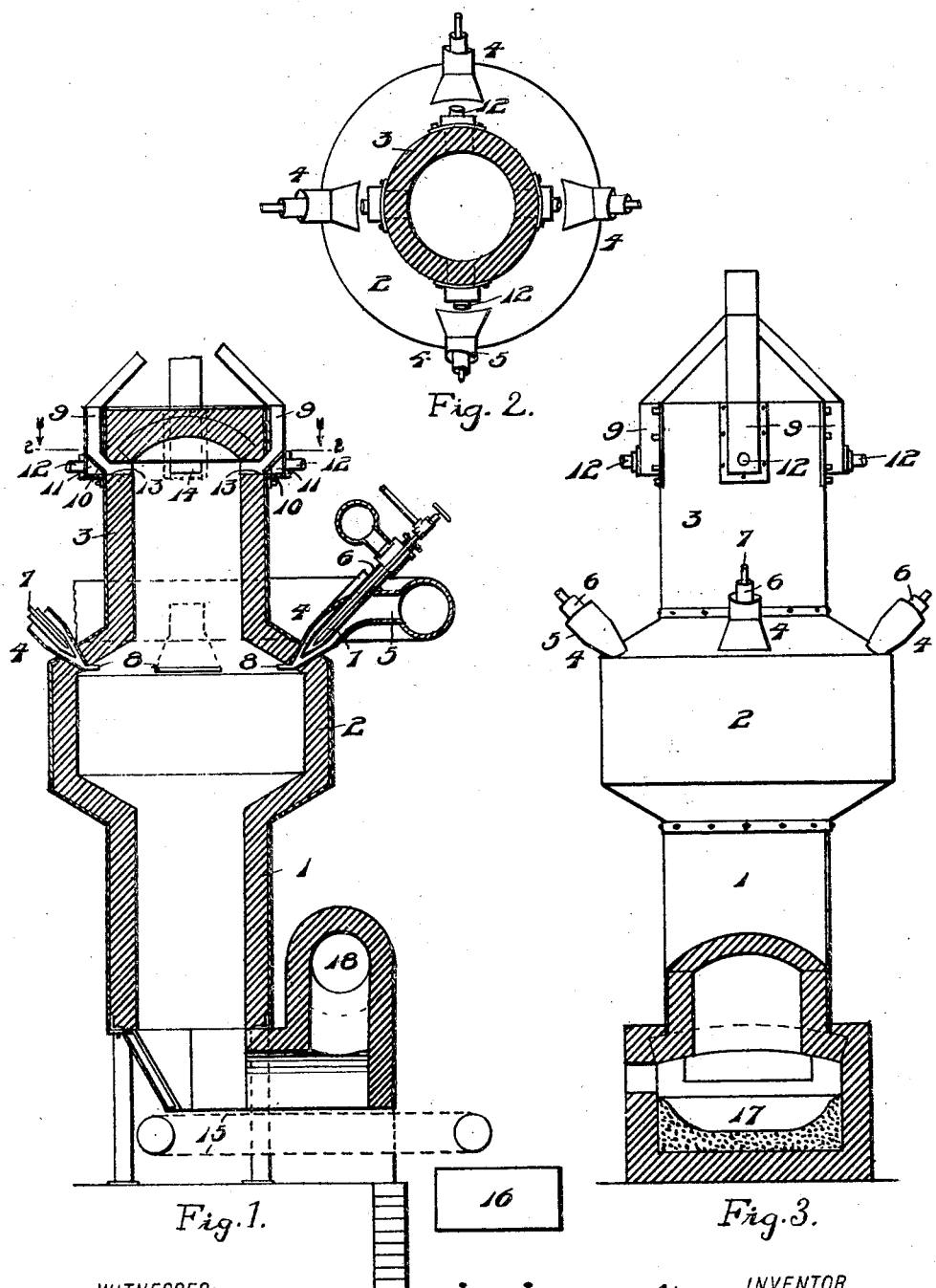

No. 806,774. PATENTED DEC. 12, 1905.
H. F. BROWN.
PROCESS OF TREATING ORES.
APPLICATION FILED MAY 25, 1904.

WITNESSES: INVENTOR
Homer F. Brown
BY Wm. L. Pierce
ATTORNEY

UNITED STATES PATENT OFFICE.

HORACE F. BROWN, OF OAKLAND, CALIFORNIA.

PROCESS OF TREATING ORES.

No. 806,774.        Specification of Letters Patent.        Patented Dec. 12, 1905.

Application filed May 25, 1904. Serial No. 209,671.

*To all whom it may concern:*

Be it known that I, HORACE F. BROWN, a citizen of the United States, residing at Oakland, in the county of Alameda and State of California, have invented or discovered new and useful Improvements in Processes of Treating Ores, of which the following is a specification.

The present invention relates to the process by which ore-dust and finely-divided ores are prepared for subsequent treatment in blast or open-hearth furnaces in the manufacture of steel and iron.

In the manufacture of iron and steel from oxidized ores it is the present practice to charge into what are commonly called "blast-furnaces" alternate layers of ore, fluxes, and fuel in the form usually of charcoal or coke until the charge in the furnace stands from forty to eighty feet or more high. The heat of the furnace is maintained by blowing highly-heated air through twyers located near the bottom of the furnace-stack. To force the air through the mass of material above the twyers requires a very high pressure. The oxidized ores, which are largely used and most desirable to use, are by nature soft and friable and initially in a fine state of subdivision and when exposed to heat or atmospheric influences rapidly become powdered. This disintegration takes place rapidly in the furnace, causing the charge to become very compact, which necessitates a still greater pressure of the air-blast through the twyers in order to penetrate it. The result is that the air and gases seek channels of least resistance and rush through such channels with great velocity, blowing out a large quantity of ore in the form of exceedingly fine dust.

The forming of channels causes portions of the furnace charge to become partially melted, so that it becomes agglomerated to an extent. The channels shifting from place to place allow such partially-agglomerated portions to cool and harden slightly, with the result that the charge hangs or remains suspended until some of the surrounding ore is removed by melting or by the withdrawal of the portions of the charge which sustains the hanging mass. In time this mass breaks loose or slips down suddenly, causing an explosion of the furnace-gases, forcing open the safety or explosion doors and throwing tons of finely-divided material over the surrounding country, causing great loss of ore and great damage to property.

When working normally, about ten per cent. of the total charge is collected as dust which carries about fifty per cent. of metallic iron in the form of ferric oxid, five to eight per cent. of silica, two to three per cent. of lime, alumina, &c., and about two per cent. of carbon in the form of fine coke. This dust has the average value of the original ore, but being dehydrated is almost absolute powder. Attempts have been made to form it into briquets with some neutral bonding material, but with very unsatisfactory results, as no bond is of any use under the fierce heat of the furnace. Attempts have also been made to form the dust into clinkers or slag by adding powdered slag and other ingredients to form a fusible material for bonding it together. This mixture has been treated in horizontal revolving cylinders and the like and subjected to heat with some degree of success; but the poor application of heat, due to the nature of the devices employed, and the additional burden due to the slag and other bonding material has largely neutralized the benefit sought.

In the reduction of iron ores the first effect of the hot gases, composed largely of carbon monoxid, is to deoxidize the ore, reducing it to a carbureted state. In this state it is somewhat plastic and is known as "sponge." Before the silicious and other foreign matter is thoroughly melted the ore becomes sticky and has a tendency to adhere to the walls of the furnace and cohere into masses. My present invention has to do in part with this sticky property of the ore. The effect of the sticking to the walls is the deterioration thereof by the chemical action of the ore, as is well known. I overcome the difficulties above enumerated by partially reducing or "sponging" the finely-divided dust or ore, so that it cools and agglomerates into clinkers sufficiently strong to stand the burden of the furnace. This I do before charging the ore into the blast-furnace. This changes the finely-divided particles to coarse ore partially deoxidized, which melts in the furnace without disintegration, obviating losses of dust, "slips," and the necessity of extremely high air-blast pressures.

Examples of the apparatus by which I may accomplish the results which I aim to secure are shown on the accompanying drawings, in which—

Figure 1 is a vertical section of one form of such apparatus. Fig. 2 is a cross-section thereof on the line 2 2 of Fig. 1. Fig. 3 is a vertical section of another form of my invention for use in conjunction with an open-hearth furnace.

In the drawings, 1, 2, and 3 designate the lower, middle, and top sections, respectively, of a vertical furnace-shaft, all the sections being preferably circular in cross-section. The middle section 2 has a larger diameter than the other two sections, whose diameters are preferably equal. The middle section is connected by inclined contracted shoulders to the top and bottom sections and constitutes a combustion-chamber.

Arranged at suitable intervals about the section 2 are the hydrocarbon-burners 4, with inclosing air-pipes 5, designed to furnish volume of air under low pressure for oxidizing purposes and complete combustion of the fuel. The smaller intermediate pipes 6 are designed for air or steam under high pressure for breaking up or vaporizing the gas or oil fuel injected into the chamber 2 through the inner pipes 7, the whole in principle forming practically an ordinary hydrocarbon-burner, with this difference, which is essential, that the mouths of the burners and inclosing air-pipes are flattened and widened, as shown at 8, so as to admit the air and oil vapors in a thin sheet entirely encircling the periphery of the combustion-chamber. Thus there will be a sheet of flame all around the periphery of this chamber having a strong flow toward the center of the upper end of the section 1, forming a protective cushion to keep the ore from the walls.

9 designates distributing-boxes forming parts of the ore-feeding device, into which the ore or dust is discharged from an elevator or other device. The deflecting-plates 10 at the bottom of the boxes throw the ore in flat streams toward and into the top of the section 3, which has a closed top, as shown on the drawings.

Under the deflecting-plates 10 are pressure-chambers 11, having at their outer sides the inlet-pipes 12, and at their inner sides, at the lower end of the plates 10, narrow slits 13, which are opposite the radial feed-opening 14 through the wall of the section 3. Blast-pressure of preferably hot or regenerated air is supplied to the pipes 12, and a hydrocarbon fuel may be passed therethrough when the ore or dust needs the action of a reducing-flame. If desired, the necessary carbon for a reduction may be added in a fine state to the ore or dust.

As the dust or finely-divided ore slides down the plates 10 it is caught by the hot blast and driven into the stack as a cloud or vapory mass. In this condition every particle is instantly attacked by the heat reflected up from the combustion-chamber, and the atoms of coke-dust burn almost instantaneously, forming a large volume of carbon-monoxid gas. Taking the heat at the combustion-chamber at 2,500° Fahrenheit, the temperature of the upper end of the section 3 will be about 2,000°. This will heat each ore particle to incandescence instantly. In this condition the deoxidation is equally instantaneous, and by the time the dust particles reach the combustion-chamber the iron is almost completely sponge.

The effect of the burning gases in the chamber 2 is to form an inverted cone down which the deoxidized dust falls and is carried by the constantly-narrowing portion of the blast-currents, so as to come into physical contact and become agglomerated almost completely. Without the excess of hot oxygen forced in to cause rapid and complete combustion of the fuel the iron would all be reduced; but as this is not desirable in the class of material now under consideration it is prevented to any desired extent by regulating this excess in well-known ways.

The "sponged" and semifluid material is deposited on a moving platform or conveyer 15. This conveyer discharges into a car 16 or other transferring or storing device. The material may be cooled by a spray of water or other means.

In Fig. 3 I have shown the material delivered upon the hearth 17 of an open-hearth furnace, in which the treatment of the ore is an immediate continuation of the processes above described.

The rapid downward current of the burning gases will tend to carry the falling dust particles away from the walls to the center of the stack or furnace, where they will come into contact and become agglomerated. The walls will thus be protected from the chemical action of the iron oxids yet remaining in the partially-reduced ore. In their downward travel the gases will not expand, as the shaft is substantially of a uniform diameter. Where the wall flares downwardly, the gases expand as they travel, causing a decided drop in their temperature in accordance with well-known laws in pneumatics. It is an advantage to hold the temperature up all the way down the shaft, as thereby the ore particles will be softer and more sticky, so as to agglomerate better.

18 is the outlet or offtake for the spent furnace-gases.

Instead of making the burners with such flaring mouths, as shown, a larger number of burners may be used to give a complete circle of flame.

While I have heretofore proposed to give the gases a whirling motion which prolongs the travel of the particles treated, thus forming a vortex and allowing a longer time for complete reduction, the cost is more and the same is not necessary in the present case where only partial reduction is aimed at; but I do not exclude the whirling actions in claims which do not preclude it.

In the upper section or chamber I can oxidize the ores, such as sulfids, as desired, or I can permit any desired reduction or deoxidation of the ores by the carbon present therein. By having the combustion-chamber larger than the other sections or chambers the gases are more completely consumed, and a cushion heretofore mentioned is formed around the walls to prevent the accretion of the fine and fusing material.

My furnace is not limited to the treatment of iron ores or the dust collected from blast-furnaces, as it may be used for the treatment of various other ores where a preliminary desulfurization or roasting is necessary or a preliminary reduction is necessary before the agglomeration of the metallic or partially metallic mass.

The reducing fuel used in the combustion-chamber 2 is oil or other carbonaceous fuel injected into the chamber in excess of the oxygen necessary for complete combustion, thus producing superheated reducing-gases, as carbon monoxid, which act on the ores approximately to the bottom of the shaft. Powdered coke or charcoal can be fed with the ore or into the stack at any desired point to increase the reducing action, if desired.

By the word "atmospheric" used in the claim I refer to the gases in the furnace, whatever the constitution may be.

I do not desire to be limited to processes which employ the precise apparatus or construction shown, as the results I attain may be reached by variously-constructed apparatus.

In the claim the word "ores" is intended to include what is known as "flue-dust," as well as ores and mixtures which have not been through the blast-furnace.

What I claim is—

The process of treating finely-divided iron ores which consists in reducing the same while in atmospheric suspension and during such suspension causing the reduced particles to agglomerate into clinker, the bonding of the ore being caused by the resultant spongy condition thereof.

Signed at Pittsburg this 23d day of May, 1904.

HORACE F. BROWN.

Witnesses:
F. N. BARBER,
A. M. STEEN.